United States Patent [19]

Lim, Jr.

[11] Patent Number: 4,793,424

[45] Date of Patent: Dec. 27, 1988

[54] SELF-LUBRICATING WELL TOOLS AND SEAL ELEMENTS THEREFOR

[75] Inventor: Honorio Y. Lim, Jr., Houston, Tex.

[73] Assignee: Drilex Systems, Inc., Houston, Tex.

[21] Appl. No.: 20,260

[22] Filed: Feb. 27, 1987

[51] Int. Cl.$^4$ .............................................. E21B 10/22
[52] U.S. Cl. ...................................... 175/228; 175/337; 277/23
[58] Field of Search ............... 175/227, 228, 337, 345, 175/346, 371, 406, 409; 277/23, 237 A, DIG. 4; 384/93

[56] References Cited

U.S. PATENT DOCUMENTS

| | | | |
|---|---|---|---|
| 2,391,577 | 12/1945 | Larson | 277/23 X |
| 3,093,380 | 6/1963 | Macks | 277/23 X |
| 3,206,216 | 9/1965 | Crook | 277/23 |
| 3,679,278 | 7/1972 | Lucas | 277/23 X |
| 3,897,837 | 8/1975 | Peterson | 175/228 |
| 3,921,735 | 11/1975 | Dysart | 175/337 |
| 4,019,591 | 4/1977 | Fox | 175/107 |
| 4,092,054 | 5/1978 | Dye | 175/337 X |
| 4,182,425 | 1/1980 | Garrett | 175/228 |
| 4,227,586 | 10/1980 | Bassinger | 175/346 |
| 4,256,189 | 3/1981 | Fox et al. | 175/40 |
| 4,261,426 | 4/1981 | Garrett | 175/228 |
| 4,262,759 | 4/1981 | Young et al. | 175/227 |
| 4,378,058 | 3/1983 | Allison | 175/228 |
| 4,398,610 | 8/1983 | Bassinger | 175/228 |
| 4,561,508 | 12/1985 | Garrett | 175/347 |
| 4,688,651 | 8/1987 | Dysart | 175/371 |

FOREIGN PATENT DOCUMENTS

| | | | |
|---|---|---|---|
| 1159220 | 12/1963 | Fed. Rep. of Germany | 277/23 |
| 874884 | 8/1961 | United Kingdom | 277/23 |

Primary Examiner—Jerome W. Massie
Assistant Examiner—William P. Neuder
Attorney, Agent, or Firm—Edgar A. Zarins; Malcolm L. Sutherland; Leon E. Redman

[57] ABSTRACT

A seal element for oil well tools, such as drilling cutters and roller reamers, which allows the drilling media to permeate into the bearing system of the cutter to cool and lubricate the internal mechanism. The seal element is adapted to control the particle size of contaminants flowing into the bearing system by filtering the drilling media. The bearings act as agitators during operation of the cutter to promote fluid motion through the bearing system. The seal and lubrication system may be utilized as a back-up to the conventional lubrication supply or as supplemental lubrication.

19 Claims, 1 Drawing Sheet

U.S. Patent  Dec. 27, 1988  4,793,424
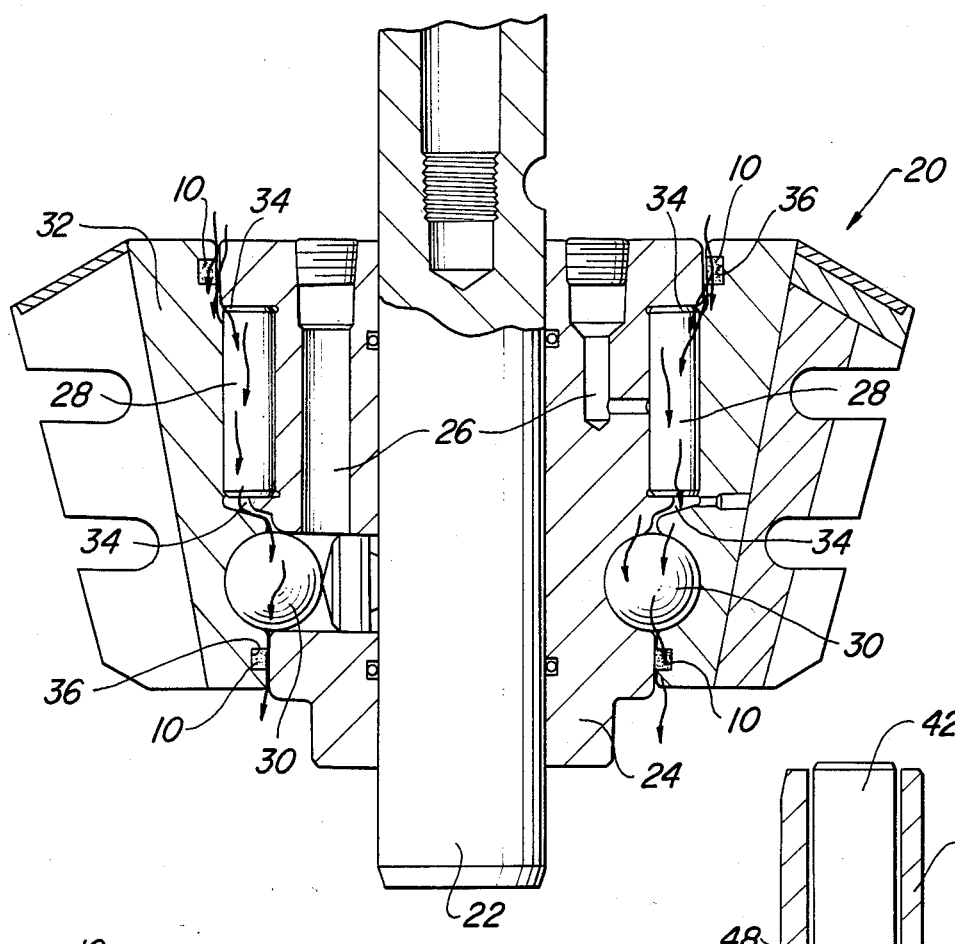
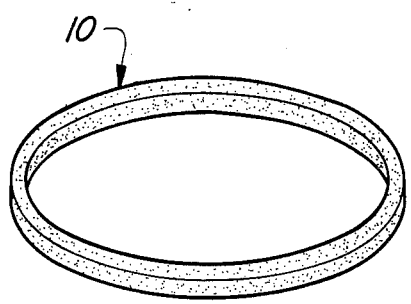
Fig-3
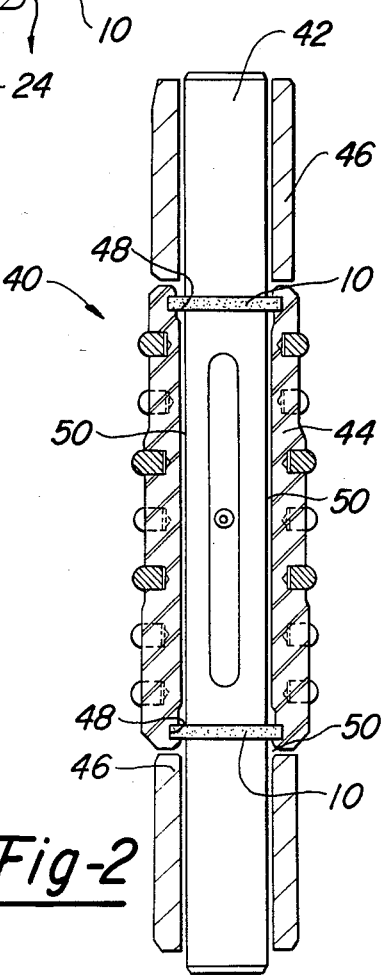
Fig-2

4,793,424

SELF-LUBRICATING WELL TOOLS AND SEAL ELEMENTS THEREFOR

BACKGROUND OF THE INVENTION

I. Field of the Invention

This invention relates to oil well tools having means for providing supplementary lubrication of the bearing assembly thereof and, in particular, to a porous seal element which allows the flow of the drilling media into the bearing assembly while filtering damaging particulates.

II. Description of the Prior Art

Sealed bearing and lubrication assemblies for oil tools, such as cutters and roller reamers, are widely utilized to extend the useful life of such tools. Without continuous lubrication the heat and friction caused by rotation of the tool will damage the bearings causing a breakdown of the tool. Similarly, without seals to enclose the bearing housing, damaging particles will flow into the apparatus while lubricant will escape therefrom. In either event, the useful life of the tool will be severely limited. Thus, such rotating tools are generally provided with a lubrication reservoir and seal elements to extend the life of the tool.

An example of such a sealed bearing system is shown in U.S. Pat. No. 4,182,425 directed to a reamer having a pressure compensated sealed bearing assembly. It was found, however, that the bearing design with an initial supply of lubricant would outlast the tungsten carbide cutting elements and therefore the inclusion of a supplemental supply of lubricant was unnecessary. With the improvement of the cutter elements to extend their useful life, improved sealing and lubrication systems are necessary. The pressure compensated lubrication reservoir, which depends upon down hole pressure to provide a continuous supply of lubricant, can be costly to manufacture and may malfunction or become depleted resulting in damage to the tool.

Other systems have been developed which utilize the lubricating properties of the drilling media. These assemblies permit free flow through the tool in order to allow the drilling media to lubricate the bearing assembly. However, because of the formation cutting particles found in these down hole fluids, damage and malfunction were often the end results of such systems. Thus, such tools had a short useful life requiring frequent replacement.

SUMMARY OF THE PRESENT INVENTION

The present invention overcomes the disadvantages of the prior known lubrication systems by providing a self-lubricating oil well tool which utilizes porous seals which permit the flow of drilling fluids through the well tool while filtering and preventing large particles of formation cuttings from damaging the tool.

The seal system of the present invention may be utilized on various down hole tools which employ bearings and a rotating motion to cut through hydrocarbon reserve formations. Roller reamers and conical cutters are two specific examples of such tools which may utilize the seal system. The seal system consists of porous or permeable seal elements which filter damaging formation particles while allowing the free flow of down hole fluids through the bearing system of the tool to lubricate and cool the bearings. The lubricating properties of the drilling media may be utilized to supplement the existing lubrication or as the sole means of lubrication.

The seal system generally comprises a pair of porous or permeable seal elements disposed on opposite sides of the internal bearing assembly to enclose the lubricant passageway. Preferably, the seal elements are in the form of O-rings having either a rectangular or circular cross-section. The seals are adapted to seat within seal grooves formed in either the stationary mounting member or the rotating cutter member. Such grooves are normally found on such tools to receive conventional rubber seals utilized to positively seal the interior lubrication chamber. The seal elements may be formed of any porous or permeable material which can control the particle size that will be allowed to flow into the bearing assembly along with the drilling fluid. Preferred material compositions for the seal elements include reticulated or open-celled foam, felt fabric, braided rope, woven or braided metal mesh, and rolled metallic or synthetic screen. The choice of material is dependent upon the formation materials encountered and the drilling environment. Fluid flow through the seals and tool is facilitated by the down hole fluid pressure and the agitating motion of the bearings within the tool.

Other objects, features and advantages of the present invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views, and in which:

FIG. 1 is a cross-sectional perspective of a conical cutter which employs the seal system of the present invention;

FIG. 2 is a cross-sectional perspective of a roller reamer which employs the seal system of the present invention; and FIG. 3 is an elevated perspective of a seal element of the present invention.

Detailed Description of a Preferred Embodiment of the Present Invention

FIGS. 1 and 2 of the drawings illustrate two examples of drilling tools used in the formation and completion of oil well boreholes which may utilize the seal element 10 of the present invention. FIG. 1 illustrates a substantially conical cutter assembly 20 while FIG. 3 illustrates a roller reamer assembly 40. It is to be understood that these two tools are merely examples of the types of drilling assemblies which may utilize the seal element 10 of the present invention.

As illustrated in FIG. 3, the seal system of the present invention generally comprises at least one seal element 10. The seal element 10 is of the O-ring type with either a substantially rectangular cross-section as shown in FIG. 3, or a circular cross-section as is commonly found in conventional seal members. The cross-sectional configuration of the seal element 10 is dependent upon the desired properties of the seal system and the size and shape of the groove formed in the tool within which the seal element 10 is seated.

In the preferred embodiment of the invention, the seal element 10 is manufactured from a porous or permeable material which allows fluid flow therethrough while filtering formation cutting particles. In this manner, the lubrication properties of the downhole fluids can be used to lubricate and cool the interior assembly of the drilling apparatus while damaging particulates are prevented from flowing into the tool. The filtered fluids from the drilling environment can be utilized as a supplement to a lubricant reservoir found in many tools, replacing the provided lubricant as it is depleted, or as the sole means of lubricating the interior assembly. The seal element 10 can be made of any porous or permeable material which permits fluid flow therethrough while filtering particulates. Materials of different densities or porosities may be utilized according to the filtering requirements, including fluid viscosity and the size and density of the particles in the fluid environment. Preferred material compositions include fabric or felt, reticulated or open-celled foam, woven metal mesh, braided rope and rolled metallic or synthetic screen. A highly suitable specific example comprises a thermally reticulated, fully open-pore flexible cellular plastic manufactured by Scotfoam Corporation under the registered trademark SCOTFELT and the name Custom Felt. This reticulated foam is a compressed flexible polyester polyurethane foam having a porosity grading ranging from 250 pores per inch (ppi) to 10 pores per inch. The specific porosity which is utilized would be dependent upon the physical properties of the fluid environment to be filtered and the available groove size for receiving the seal element 10. However, excellent results have been obtained with a reticulated foam seal element 10 having a porosity of 80 ppi which is capable of filtering particles down to 35 microns in size.

Referring now to specific uses of the seal elements 10, FIG. 1 shows a substantially conical cutter assembly 20 utilized in hole enlarging and other drilling operations. The cutter assembly 20 generally comprises a shaft or pin 22 to which is coaxially mounted a stationary sleeve member 24. The stationary member 24 may include a lubrication or grease chamber 26 adapted to provide a continuous supply of lubricant to the bearing assembly. In the cutter assembly 20, the bearing assembly comprises roller bearings 28 and ball bearings 30. Rotatably mounted to the stationary sleeve member 24 is a cutter member 32, the sleeve 24 and cutter 32 cooperating to form a lubricant passageway 34 therebetween. Disposed within the lubricant passageway 34, which communicates with the grease chamber 26, is the bearing assembly. Thus, the lubricant supply in the grease chamber 26 is utilized to lubricate and cool the bearing assembly. However, continued use of the tool 20 results in depletion of the lubricant.

In order to supplement the lubricant supply, seal elements 10 are disposed at opposite ends of the lubricant passageway 34 to allow drilling fluid to flow through the bearing assembly. As shown in FIG. 1, a pair of seal elements 10 having different diameters are disposed within the drilling apparatus 20. The seal elements 10 are seated within annular grooves 36 formed in the rotatable cutter member 32. Alternatively, the grooves 36 may be formed in the stationary sleeve member 24. However, these grooves are normally found on such tools in order to retain the conventional rubber O-ring seals. Thus, the permeable seal elements 10 allow the flow of drilling fluid, in either direction, into the lubricant passageway 34 and the bearing assembly. The downhole fluid pressure and the agitating motion of the bearings 28 and 30 will promote fluid flow through passageway 34 thereby replacing the depleted lubricant and mixing with the remaining lubricant. Of course, the seal system of the present invention could be utilized as the sole lubrication means when the inclusion of a grease chamber is uneconomical or undesirable. As an alternative, only one seal element 10 may be included along with one conventional seal in order to allow fluid flow in only one direction. In either configuration, the seal elements 10 permit the flow of drilling fluid into the bearing assembly while filtering solid particulates which may damage the bearings 28 and 30 reducing the useful life of the tool 20.

Referring now to FIG. 2, the seal system of the present invention may be used in other drilling tools such as the roller reamer assembly 40. The roller reamer 40 generally comprises a stationary mounting member or mandrel 42 and a rotatable cutter member 44 coaxially mounted to the mandrel 42. The cutter member 44 is positionally maintained by fixed end bushings 46. The roller reamer 40 includes a pair of seal elements 10 disposed at opposite ends of the reamer-cutter 44. The seal elements 10 are seated within annular grooves 48 formed in the rotatable cutter member 44 and normally used to retain conventional seals. Alternatively, the annular grooves 48 may be formed in the mandrel 42 or at the ends of the bushings 46. In this manner, a lubricant passageway 50 is formed between the cutter member 44 and the stationary member 42 and may be extended to include the gap between the bushings 46 and the cutter member 44 by placing the seal element 10 therebetween. Thus, filtered drilling fluid is allowed to flow in either direction through the seal elements 10 into the lubricant passageway 50 to reduce the frictional wear between the roller 44 and the mandrel 42. Downhole fluid pressure and the agitating motion of the rotating cutter 44 promote fluid flow through the passageway 50.

Thus, the seal system of the present invention provides a means of supplementing the lubricant supply of a drilling apparatus by allowing the flow of filtered drilling fluids into the bearing assembly or cooperating surfaces of the tool. Alternatively, the filtered drilling fluids can be utilized as the sole lubrication for engaging surfaces.

The foregoing detailed description has been given for clearness of understanding only and no unnecessary limitations should be understood therefrom as some modifications will be obvious to those skilled in the art without departing from the scope and spirit of the appended claims.

I claim:

1. A seal system for a borehole drilling apparatus operated in a downhole fluid drilling environment, the drilling apparatus having an internal bearing assembly, said seal system comprising:

at least one permeable seal element disposed within the drilling apparatus, said seal element adapted to permit the flow of the drilling fluid from the exterior environment of the apparatus through the apparatus and bearing assembly while filtering solid particles from the drilling fluid flowing therethrough, the downhole drilling fluid flowing through said at least one seal element and the apparatus to supplement lubrication of the bearing assembly.

2. The seal system as defined in claim 1 wherein said seal system comprises a pair of seal elements, one of said seal elements disposed on opposite sides of the bearing assembly whereby the drilling fluid flows through one of said seal elements, through the bearing assembly, and through another of said seal elements.

3. The seal system as defined in claim 2 wherein the drilling apparatus includes at least one annular groove for receiving a seal element, one of said seal elements seated within said annular groove of the drilling apparatus.

4. The seal system as defined in claim 3 wherein said seal element is made of a a reticulated foam material adapted to permit fluid flow therethrough while filtering solid particles from the drilling fluid.

5. The seal system as defined in claim 3 wherein said seal element is made of a felt fabric material adapted to permit fluid flow therethrough while filtering solid particles from the drilling fluid.

6. The seal system as defined in claim 3 wherein said seal element is made of a metal woven mesh material.

7. In a seal system for a borehole drilling apparatus operated in a downhole fluid drilling environment and having a stationary mounting member and cutter member rotatable relative to the mounting member, the mounting member and the cutter member cooperating to define therebetween a lubricant passageway, said seal system comprising:
at least one permeable seal element disposed within the lubricant passageway between the rotatable cutter member and the mounting member of the drilling apparatus, said seal element adapted to permit the flow of drilling fluid from the exterior environment of the apparatus into the lubricant passageway while filtering solid particles from the drilling fluid flowing through said seal element.

8. The seal system as defined in claim 7 wherein said seal system comprises a pair of seal elements disposed at opposite ends of the lubricant passageway, the drilling fluid flowing into the lubricant passageway through said seal elements.

9. The seal system as defined in claim 8 wherein one of the stationary members and the cutter member have at least one annular groove for receipt of said seal element.

10. The seal system as defined in claim 9 wherein the drilling apparatus includes a bearing assembly disposed in the lubricant passageway, the drilling fluid flowing through said seal elements lubricating the bearing assembly.

11. The seal system as defined in claim 10 wherein a predetermined supply of lubricant is provided within the lubricant passageway, the drilling fluid adapted to supplement the lubricant supply during operation of the drilling apparatus.

12. The seal system as defined in claim 8 wherein said seal element is made of an open-celled porous material.

13. The seal system as defined in claim 12 wherein said seal element is made of a reticulated foam material.

14. The seal system as defined in claim 8 wherein said seal element is made of a felt fabric material.

15. The seal system as defined in claim 8 wherein said seal element is made of a woven metal mesh.

16. In a seal system for a borehole drilling apparatus operated in a downhole fluid drilling environment and having a stationary mounting member cooperating with a rotatable cutter member to define therebetween a lubricant passageway, the lubricant passageway having a bearing assembly disposed therein, said seal system comprising:
a pair of permeable seal elements disposed within the lubricant passageway on opposite sides of the bearing assembly, said seal elements adapted to permit the flow of the downhole drilling fluid from the exterior environment of the apparatus therethrough into the lubricant passageway to lubricate the bearing assembly while filtering solid particles from the drilling fluid flowing through said seal elements.

17. The seal system as defined in claim 16 wherein one of the stationary mounting members and the cutter member includes a pair of annular grooves, one of said seal elements disposed in each groove, said seal elements engaging both the mounting member and the cutting member to enclose the lubricant passageway.

18. The seal system as defined in claim 17 wherein said seal element is made of a reticulated foam material.

19. The seal system as defined in claim 18 wherein said reticulated foam element has a porosity in the range of 250 pores per inch to 10 pores per inch.

* * * * *